(12) United States Patent
He et al.

(10) Patent No.: US 10,785,279 B2
(45) Date of Patent: Sep. 22, 2020

(54) VIDEO ENCODING USING STARVE MODE

(71) Applicant: Facebook, Inc., Menlo Park, CA (US)

(72) Inventors: Yaming He, Redmond, WA (US); Zhengping Zuo, Medina, WA (US)

(73) Assignee: Facebook, Inc., Menlo Park, CA (US)

( * ) Notice: Subject to any disclaimer, the term of this patent is extended or adjusted under 35 U.S.C. 154(b) by 590 days.

(21) Appl. No.: 15/394,699

(22) Filed: Dec. 29, 2016

(65) Prior Publication Data

US 2018/0192061 A1    Jul. 5, 2018

(51) Int. Cl.

| H04L 29/06 | (2006.01) |
|---|---|
| H04N 19/132 | (2014.01) |
| H04N 19/164 | (2014.01) |
| H04N 19/107 | (2014.01) |
| H04N 19/124 | (2014.01) |
| H04N 19/146 | (2014.01) |
| H04N 19/172 | (2014.01) |
| H04L 12/26 | (2006.01) |

(52) U.S. Cl.
CPC ........ *H04L 65/608* (2013.01); *H04L 43/0864* (2013.01); *H04L 65/602* (2013.01); *H04L 65/607* (2013.01); *H04L 65/80* (2013.01); *H04N 19/107* (2014.11); *H04N 19/124* (2014.11); *H04N 19/132* (2014.11); *H04N 19/146* (2014.11); *H04N 19/164* (2014.11); *H04N 19/172* (2014.11)

(58) Field of Classification Search
CPC . H04L 43/0864; H04L 65/602; H04L 65/607; H04L 65/608; H04L 65/80; H04N 19/107; H04N 19/124; H04N 19/132; H04N 19/146; H04N 19/164; H04N 19/172
See application file for complete search history.

(56) References Cited

U.S. PATENT DOCUMENTS

| 6,680,976 B1* | 1/2004 | Chen ................. H04N 21/2383 375/240.12 |
|---|---|---|
| 8,578,040 B2* | 11/2013 | Banerjee ................ H04L 29/06 709/231 |
| 2003/0031128 A1* | 2/2003 | Kim ....................... H03M 7/30 370/229 |
| 2004/0181611 A1* | 9/2004 | Ratnakar .......... H04L 29/06027 709/250 |
| 2006/0026294 A1* | 2/2006 | Virdi .............. H04N 21/234381 709/232 |
| 2009/0180701 A1* | 7/2009 | Choi .................... H04N 19/176 382/236 |
| 2010/0104009 A1* | 4/2010 | Hardacker ........... H04N 19/172 375/240.12 |
| 2012/0230390 A1* | 9/2012 | Akkor .............. H04N 21/23655 375/240.02 |
| 2015/0229367 A1* | 8/2015 | Hwang ............... H04L 27/2627 375/267 |

* cited by examiner

*Primary Examiner* — Mohammed S Rahaman
(74) *Attorney, Agent, or Firm* — Sheppard Mullin Richter & Hampton LLP

(57) ABSTRACT

A video encoder may be put in a starve mode during a low latency operation in which the video encoder may be operated in a mode that allows video frames to be encoded without any interdependencies such as motion compensation. At least one encoding parameter of the video encoding is selected such that, for each resulting encoded video frame, the video frame fits in exactly one application layer packet.

17 Claims, 10 Drawing Sheets

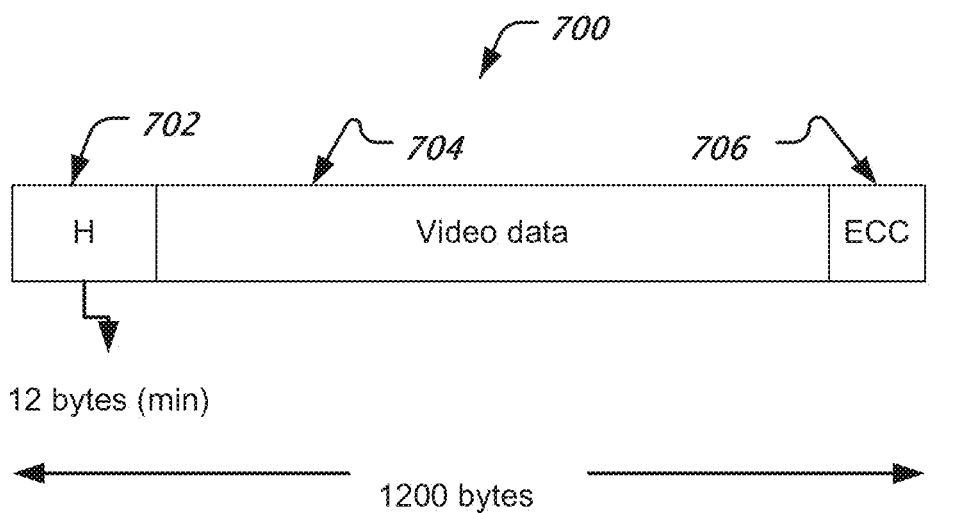
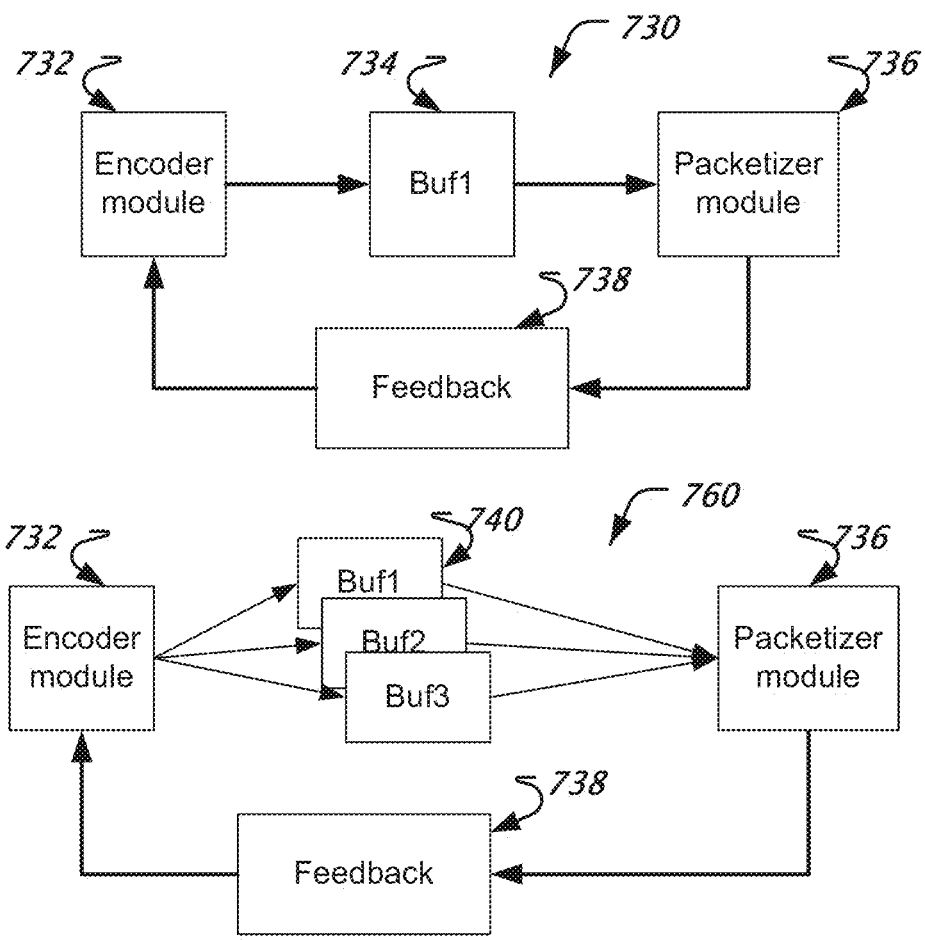
FIG. 7

VIDEO ENCODING USING STARVE MODE

TECHNICAL FIELD

This patent document relates to video processing, and in particular, relates to video compression for interactive real-time applications.

BACKGROUND

Universal availability of digital video cameras and storage products has enabled new uses of digital video. In contrast to the traditional network delivery of video (e.g., digital satellite or cable television), an increasing amount of video is being captured by users using their cameras and smartphones, and shared over the Internet with others.

Although the availability of Internet-connected video-capturing devices (e.g., mobile computing devices) has soared, the ability of these devices to encode, or compress, and allow real-time video chat is limited due to several operational reasons. Users are often in places where they share network bandwidth with other users. Video chatting under such circumstances produces unsatisfactory user experience due to dropped or lagging video, or general inability to even establish a video connection with other users.

SUMMARY

The present document describes techniques for operating a video encoder, including, for example, for low latency, real-time video communication under adverse network conditions.

In one example aspect, a disclosed method of operating a video encoder in a data communication network includes monitoring a network condition, wherein the monitoring includes tracking the status of at least some compressed video packets generated by the video encoder and transferred to the data communication network; deciding, based on the monitoring, to change the operation of the video encoder to a starve mode in which a sub-optimal mode of encoding is used for generating compressed video packets; operating, in the starve mode, the video encoder to produce intra-only compressed video frames at an output of the video encoder; selecting an encoding parameter for the intra-only compressed video frames such that each resulting intra-encoded video frame fits within a single packet of transmission at the application layer; and transferring, selectively based on the network condition, the compressed video frames to the data communication network.

In another aspect, a computer program product comprising a computer-readable medium that stores processor-executable code is disclosed. The code includes instructions for implementing a method of performing video encoding on a user device. The instructions include instructions for monitoring the condition of a network for a trigger point for switching a mode of video encoding operation to sustain an ongoing video communication due to changes in the condition; instructions for deciding, upon detecting that a trigger point has been reached and based on an identity of the trigger point, to operate a video encoder in a corresponding starve mode by modifying at least one parameter of video encoding; and instructions for transferring, selectively based on the condition of the network, compressed video frames to the network. In each starve mode corresponding to a trigger point, the video encoder is further controlled to produce, for each compressed video frame, a number of bits that fit within exactly one network packet of a pre-determined size.

In yet another aspect, an apparatus comprising a memory, a processor, and a network interface for performing real-time video communication is disclosed. The apparatus includes an encoder module that produces one or more compressed video representations of a video frame, one or more buffers that store the one or more compressed video representations, and a packetizer module that checks sizes of the one or more compressed video representations, and provides feedback to the encoder module about altering a parameter for producing the one or more compressed video representations. The encoder module is operable in at least two modes of operation, including a normal mode in which the encoder module produces the one or more compressed video representations by refraining from altering the parameter based on the feedback, and a starve mode in which the encoder module produces the one or more compressed video representation by performing intra-only encoding of the video frame and further based on the feedback received from the packetizer module.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIG. 7 illustrates various examples of video encoding embodiments;

Figure 1:
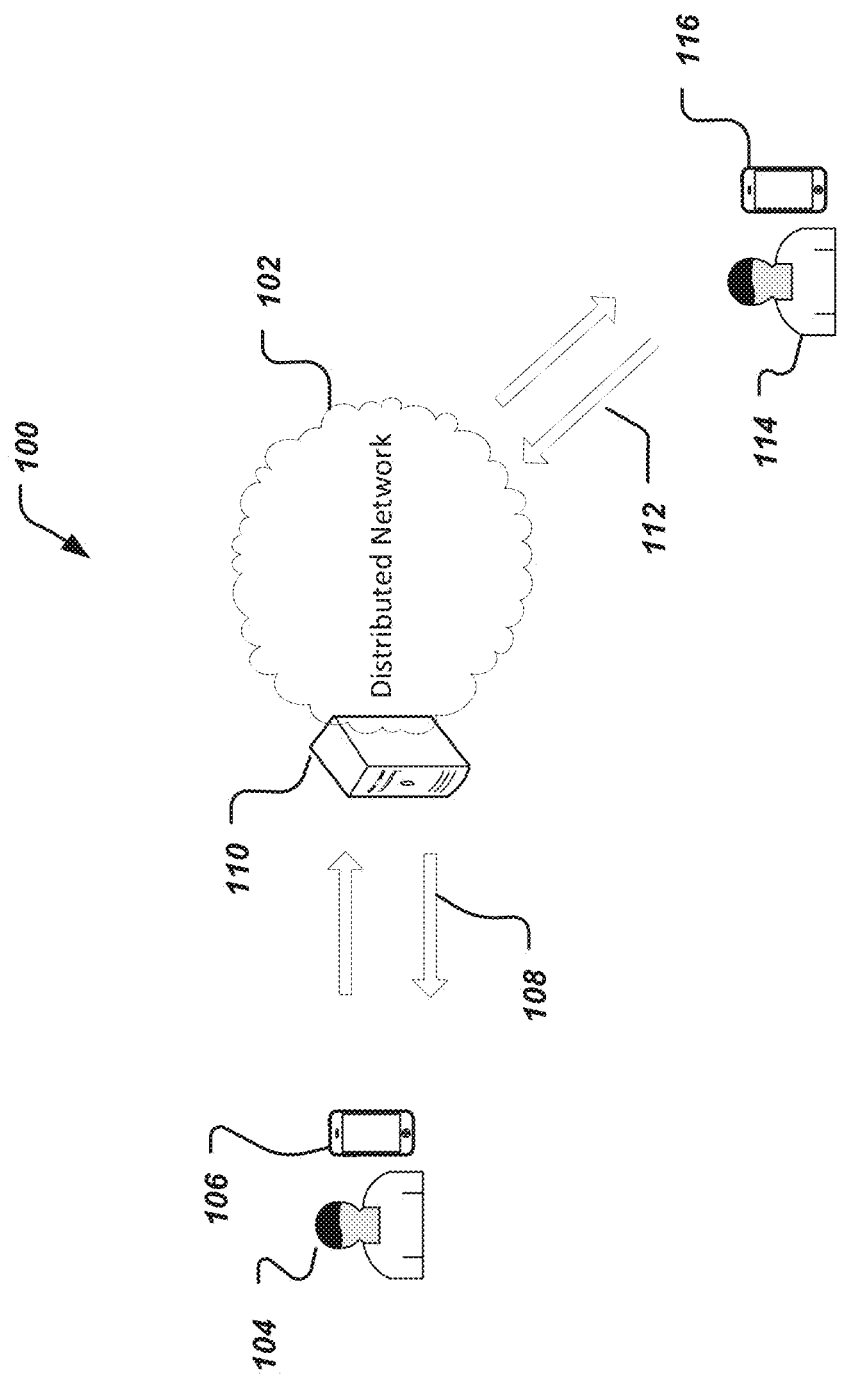
FIG. 1 illustrates an example of a communication network for video uploading and sharing, consistent with various embodiments.

Although the flow and sequence diagrams presented herein show an organization designed to make them more comprehensible by a human reader, those skilled in the art will appreciate that actual data structures used to store this information may differ from what is shown in that they, for example, may be organized in a different manner, may contain more or less information than shown, or may be compressed and/or encrypted, etc.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Many videoconferencing solutions are available today to allow users to interact with each other using video conversation. To provide high quality of user satisfaction, these systems rely on high bandwidth availability. Often, dedicated network resources are provided to carry video traffic.

With the proliferation of mobile devices equipped with cameras and displays, and the widespread availability of online social networks, users find themselves in places where they have network connectivity and want to be able to perform video chat with other users. Rather than having to launch a different software application or go look for a high bandwidth/expensive connectivity option, users would rather use the same application or user interface from which they are performing social networking with their friends for video chatting as well. However, as discussed above, operational limitations such as changes in network bandwidth often make such a video chat an unsatisfactory experience. Furthermore, complex implementations on some user devices with limited computational capacity or battery life may end up either reducing battery life significantly or may put excessive burden on the user devices during the video chat.

Typical video encoding schemes used for real-time communications/video chat ("RTC") are not optimized for the low bandwidth that cell phones sometime experience. Video encoders throw away packets during RTC rather than re-send lost packets because delayed delivery of lost packets is generally not desirable. The disclosure is directed to a "starve mode" for encoding video when experiencing low bandwidth. The encoder receives information on the current bandwidth, looks up a table to identify an acceptable frame rate and/or resolution, and adjusts the quantization parameter (Qp) for the encoder upwards or downwards so that a Real Time Transport (RTP) packet is efficiently utilized (e.g., so that the entire 1.2 Kb is used but not exceeded). Each subsequent RTP packet carries an I-frame, and no p-frames (e.g., "delta frames") are sent. The encoder checks the Real-Time Control Protocol (RTCP) receiver report at a specified frequency and leaves or enters the starve mode as necessary (e.g., when low or normal bandwidth is experienced).

These, and other aspects, are described in this document.

Various examples of the disclosed techniques will now be described in further detail. The following description provides specific details for a thorough understanding and enabling explanation of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description. In the present document, unless otherwise mentioned, the terms "video encoding" and "video compression," and the terms "encoded video" and "compressed video" are used synonymously to indicate a reduced-size representation of visual information of a video.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Overview—Example Network Topology

Turning now to the figures, FIG. 1 illustrates an example of a communication network 100 in which a distributed network 102 is operating to facilitate the use of digital video among multiple users: user 104, who may be the originator of a video using his user device 106, and users 114 with their user devices 116, who may download and view the video sequence that the user device 106 uploads to a server 110 in the distributed network 102. The user devices 106 and 116 may communicate with the distributed network 102 via communication networks or channels 108 and 112. The channels 108 and 112 may be the same or different networks (e.g., the Internet or World Wide Web) and may change from time to time based on location. For example, user devices 106 and 116 may include multiple network modules (e.g., a Wi-Fi modem, a 3G modem, a 4G modem, a WiMAX modem, etc.) and may use one or more of the network connections for communication in the upstream direction (from the device to the network) or the downstream direction (from the network to the device).

In one example use case, the user 104 may capture a video sequence using a camera-enabled smartphone (user device 106). The user 104 may then instruct the user device 106 to upload the video to the server 110, which may be a server operated by a service provider (e.g., a social media website). Once the user device 106 uploads the video to the server 110, the service provider may operate the distributed network 102 (e.g., a geographically distributed server farm) to propagate the availability of the user's video clip to other users with whom the user 104 wishes to share the video clip (e.g., user 114).

User devices 106 and 116 may often include resources for capturing video, for example, using a built-in camera, encoding or compressing the video, and transferring the video to the network via one or more of the network modules. User devices 106 and 116 may perform video encoding using a combination of code running on a processor and hardware assistance for computationally intensive functions such as transform calculations. Video encoders are often designed to produce high visual quality video output when operating within a target output bitrate. For example, a video encoder may be designed to operate in a normal mode in 200 Kbps to 2 Mbps output video range, while another video encoder may be designed to operate in the 1 Mbps to 6 Mbps range, and so on. If the video encoder is constrained to produce lower bitrate compressed video than the normal range of operation, then the visual quality of the resulting video may significantly deteriorate. In some cases (e.g., due to syntactical overheads), a video encoder may not even be able to operate below a target output bitrate. For example, some video encoders may not be able to produce compressed video at all at bitrates below 50 Kbps.

Furthermore, video encoders are often optimized to exploit redundancies in video, such as inter-frame dependencies, to improve compression efficiency of the encoding. Such optimization may impact the performance in a real-time video communication application, especially in a scenario in which available network bandwidth is unpredictable, and packets might be lost because motion-compensated compressed video typically requires more end-to-end latency for encoding and also may produce more objectionable visual artifacts when some packets are lost in the network. The visual artifacts may be worse in cases where some large video frames (e.g., intra-coded frames) may occupy several network packets and thus may increase the possibility that at least some information from the large video frame may be lost in case of packet drops.

To alleviate the video quality problems associated with changes to network bandwidth, some existing techniques provide for a network feedback mechanism by which receiving devices can provide feedback about the quality of video, as seen by the receiving device. For example, the well-known RTP transport protocol (RFC 3550) includes the RTCP that defines a mechanism for receiving devices to provide Quality of Service (QoS) information to transmitting devices. In some embodiments, RTCP information may be received at a video encoder on a periodic basis, e.g., every 2 seconds, and may provide the video encoder.

Figure 2:
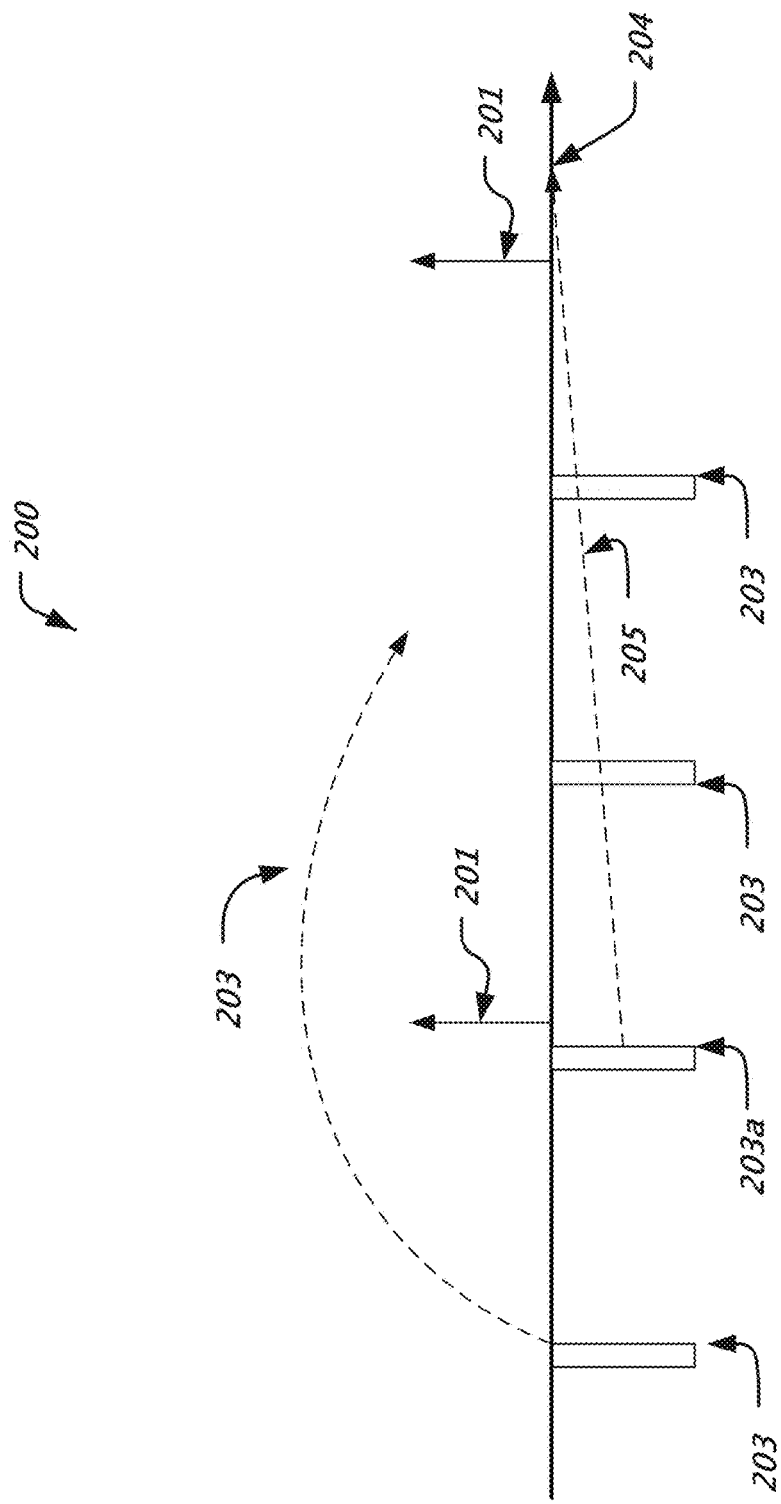
FIG. 2 illustrates a timeline of operation of a video encoder that receives network feedback.

FIG. 2 illustrates an example timeline 200 of the operation of a video encoder that receives QoS feedback information from the network.

The horizontal axis 204 represents time in arbitrary units, for example, in seconds. The time instances 201 may mark start and end times of an encoding epoch. During one encoding epoch, the video encoder may operate with a fixed set of encoding parameters such as target output bitrate. For example, in one encoding epoch, a video encoder may use a target output bitrate of 600 Kbps, while in the next encoding epoch, the target bitrate may be changed to 800 Kbps, or may be lowered to 500 Kbps, etc. It would be appreciated that while the target settings are maintained, e.g., for calculating bitrate and running internal bit allocation, actual instantaneous bitrate sometimes may vary based on the detail of video content. Such differences between the encoder's output bitrate and the actual rate of transmission on the network can be compensated by using a temporary storage buffer for storing compressed video packets.

Time instances 203 represent times at which the video encoder receives network QoS information, e.g., from RTCP packets. In some embodiments, the time instances 203 may be a relatively fixed time period apart (e.g., 2 seconds) while encoding epochs may also be of a relatively similar duration (e.g., 4 seconds each). As indicated by the dashed line 203, encoder settings in a next epoch may be influenced by the most recently received QoS report packet that the video encoder had time to receive and process. In the illustrated example, a control packet was received at time instance 203a, just prior to the onset of the video epoch that starts from time instance 201, but because the video encoder did not have the opportunity to process this packet, the network information contained within this packet was not used to decide video encoding parameters until the next video epoch 204, as indicated by dashed arrow 205.

Many different variations of the embodiment illustrated in FIG. 2 are possible. For example, in some embodiments, video epochs and the network QoS packets may be attempted to be synchronized with each other. For example, a video epoch may start at a fixed time after a video encoder receives network monitoring information. In some embodiments, video epoch duration may be dependent on how often the network monitoring information is received, or the fastest and/or the slowest rate at which the QoS information is received. In some embodiments, video epoch duration may be greater than the inter-network monitoring packet period, e.g., two to four network QoS packets may be received in each video epoch.

Using QoS information from the network, and based on locally available information such as computational resources (e.g., available processor bandwidth, fullness of video buffer, battery life of a mobile device, etc.), a video encoder may make decisions about how to operate in each video epoch. In particular, in some embodiments, video encoders may be programmed to detect extreme network conditions, or trigger points, that could result in significant changes in video quality unless some corrective action is taken. For example, if the lowest rate at which a video encoder can be operated in the normal mode is 200 Kbps and the available network bandwidth falls below 220 Kbps (or 200 Kbps), then the video encoder may have to modify encoding parameters and operate in a "starve" mode in order to maintain a reasonable visual quality of output compressed video. As described in this document, such starve mode decisions may be triggered by more than one condition such as network bandwidth, rate of packet loss, round-trip packet delay, local video buffer overflowing or underflowing, and other operational conditions of the network.

With reference to FIG. 3 to FIG. 6, various ways of operating a video encoder in a starve mode are described. The operational scenarios described in FIG. 3 to FIG. 6 may occur in the above-described video encoding epochs. That is, in some embodiments, one starve mode may be used throughout a video epoch, followed by a decision process about which starve mode to use in the next encoding epoch, and switching correspondingly—either to another starve mode, or to a non-starve mode operation of the video encoder.

Figure 3:
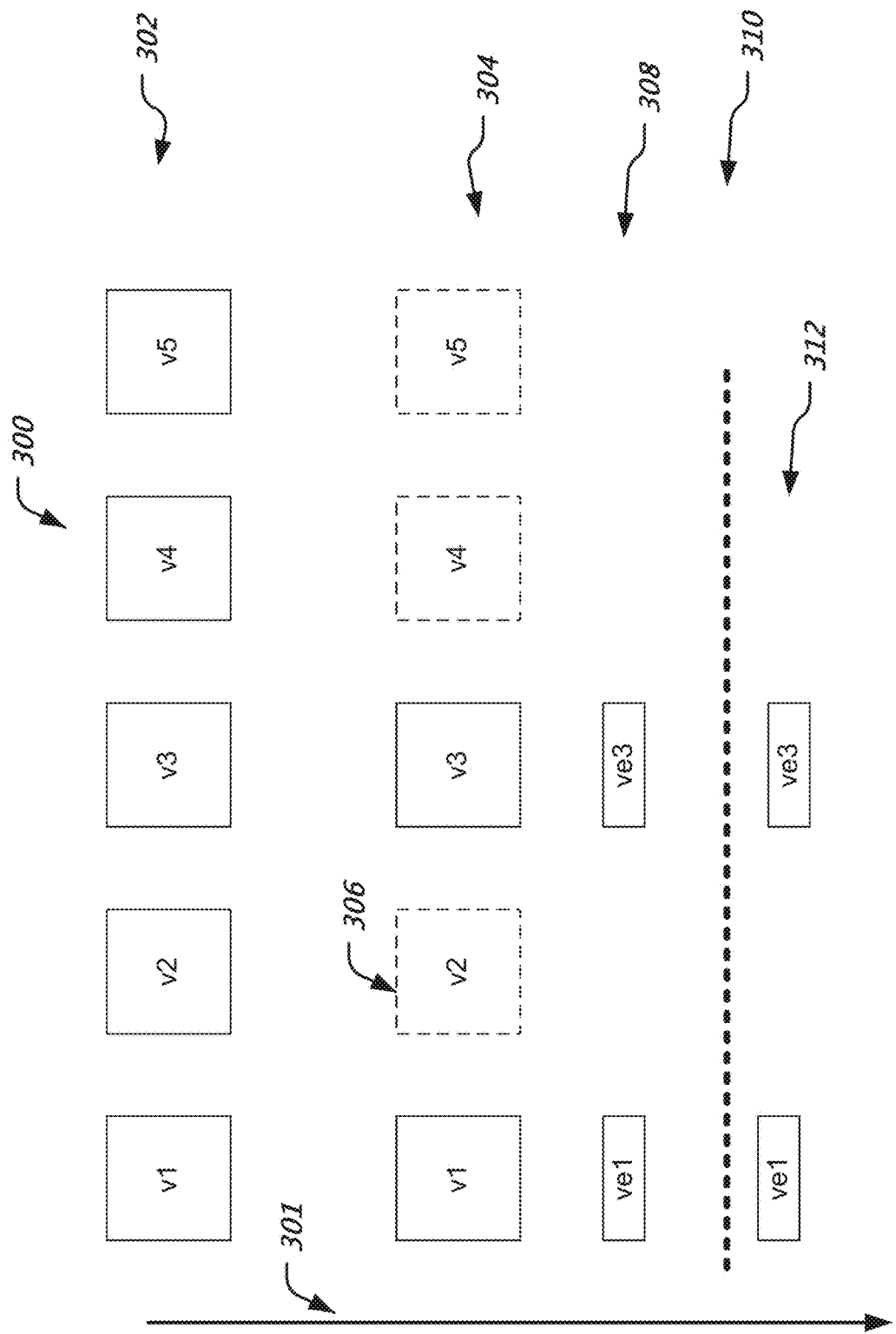
FIG. 3 illustrates an example of a video encoding timeline using frame rate reduction.

FIG. 3 is a block diagram illustration of an operational scenario 300 of a video encoder. The operational scenario 300 may occur, e.g., during one video epoch. The vertical axis 301 may generally represent a sequence of video encoder operations during the epoch. Row 302 represents a number of video frames v1 to v5 being received or generated at a user device. The video frames may have a capture resolution, for example, 640×352. Because this resolution may be different from the camera resolution at which the images are captured and internal to the user device, downsampling to a resolution suitable for video chat may be performed. For example, the camera may be capturing video in real-time at full resolution (1920×1080, 60 frames per seconds). This sequence may be downsampled to a video chat resolution of 640×352, 15 frames per seconds, as represented by row 302.

In FIG. 3, the video encoding operates by reducing the number of frames being encoded and transmitted according to the transmission bandwidth available across the network interface 310. As shown by row 308, the frames to be sent (v1 and v3 from row 304) may be encoded into their encoded video representations ve1 and ve3. The video frame v2 (306), on the other hand, may be dropped. The encoded frames ve1 and ve3 are then sent over the network. In operational scenario 300, the decision to drop frames may be made prior to performing video encoding. For example, in some embodiments, a look-up table may be maintained by which the video encoder can decide which available network bandwidth value to use for a particular frame rate. Furthermore, the decision about which frames to drop (row 304), may be performed in the uncompressed (or lightly compressed, or compressed by the capture camera) domain of video based on a repetitive sequence (e.g., every third frame) and/or may be performed in real-time based on scene changes, shakiness stabilization of video frames, and so on. Therefore, in operational scenario 300, the available user device resources for video encoding may be saved because only video frames that are actually to be transmitted may be compressed.

Figure 4:
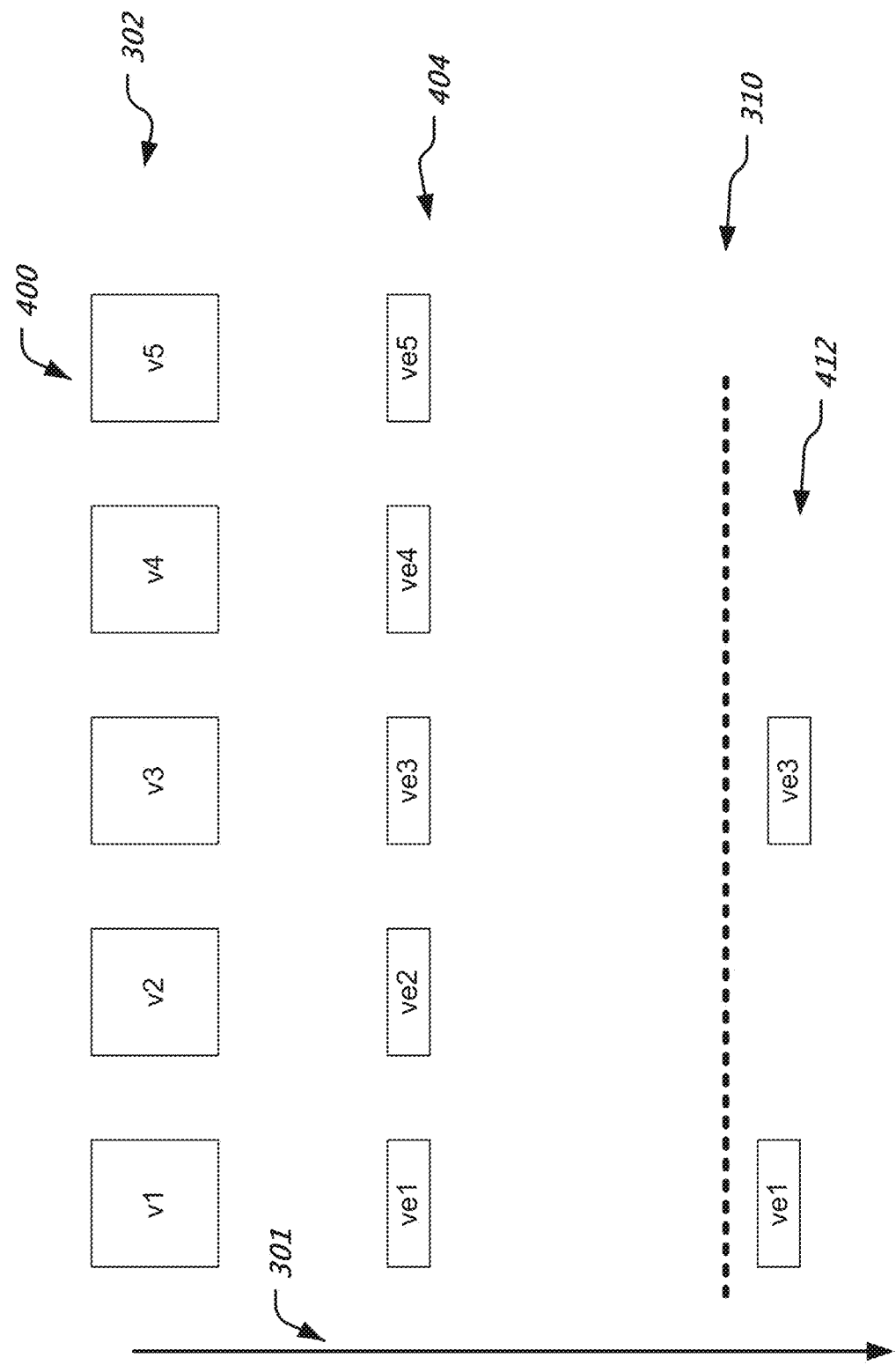
FIG. 4 illustrates another example of a video encoding timeline using frame rate reduction in the compressed domain.

In FIG. 4 operational scenario 400, no frame-dropping decision is made in the uncompressed video domain. Instead, all video frames are compressed and a compressed video stream is generated. This stream may be stored in a temporary buffer in which a decision is made in real-time about which compressed domain bits to send. One advantage of this scheme is that video compression may be performed without having to first decide whether to drop frames. Such encoding may benefit from a hardware accelerator, a co-processor, or camera-based encoding where a social media app may not be able to alter the flow of input video images in the compression pipeline.

Figure 5:
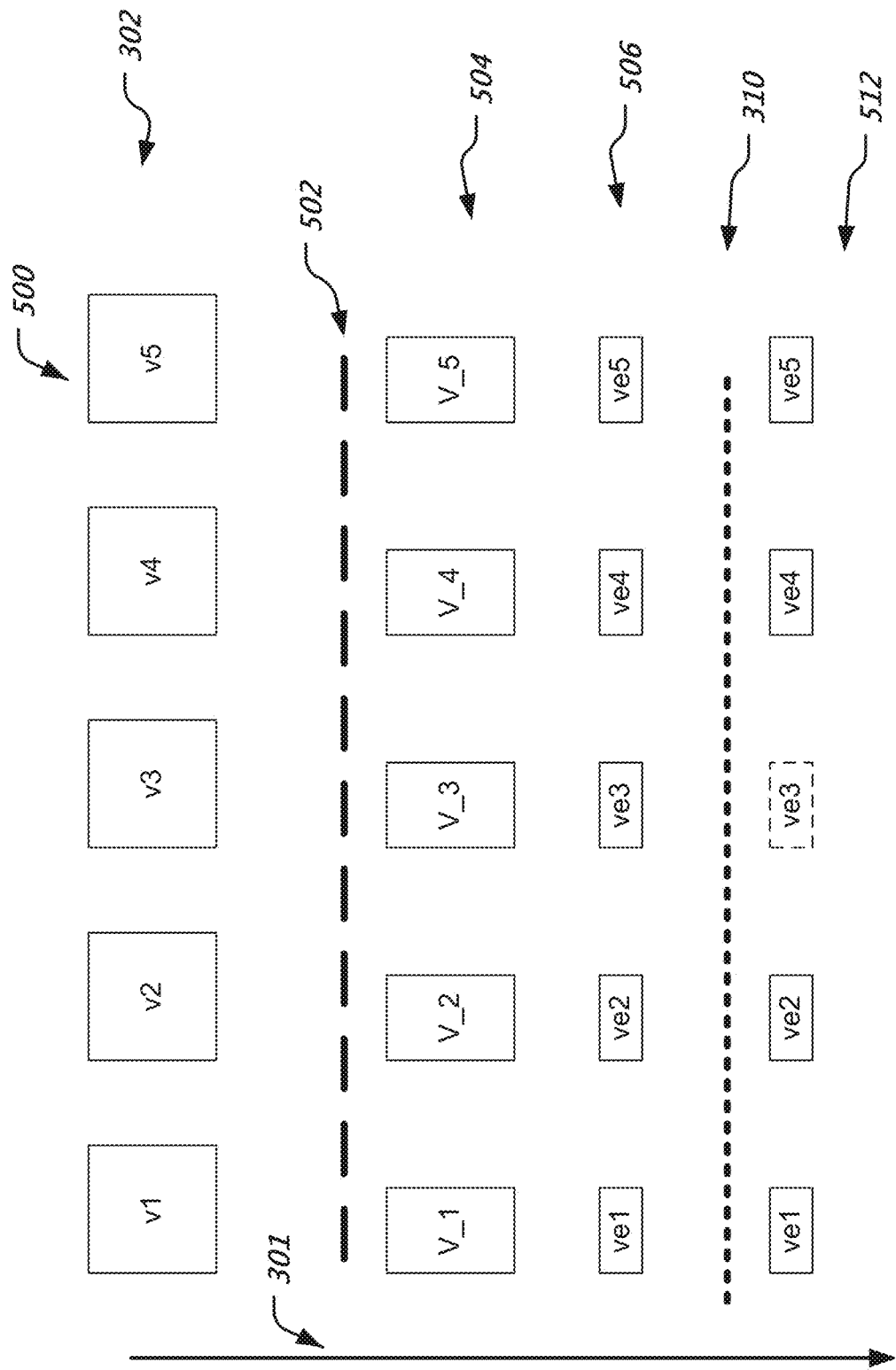
FIG. 5 illustrates another example of a video encoding timeline using resolution reduction.

In the operational scenario 500 depicted in FIG. 5, an image resolution reduction filter 502 may be applied to reduce the size of images (as depicted by video frames in row 504 having a smaller width than the corresponding source video images in row 302), followed by video compression (row 506) and selective transmission (row 512).

Figure 6:
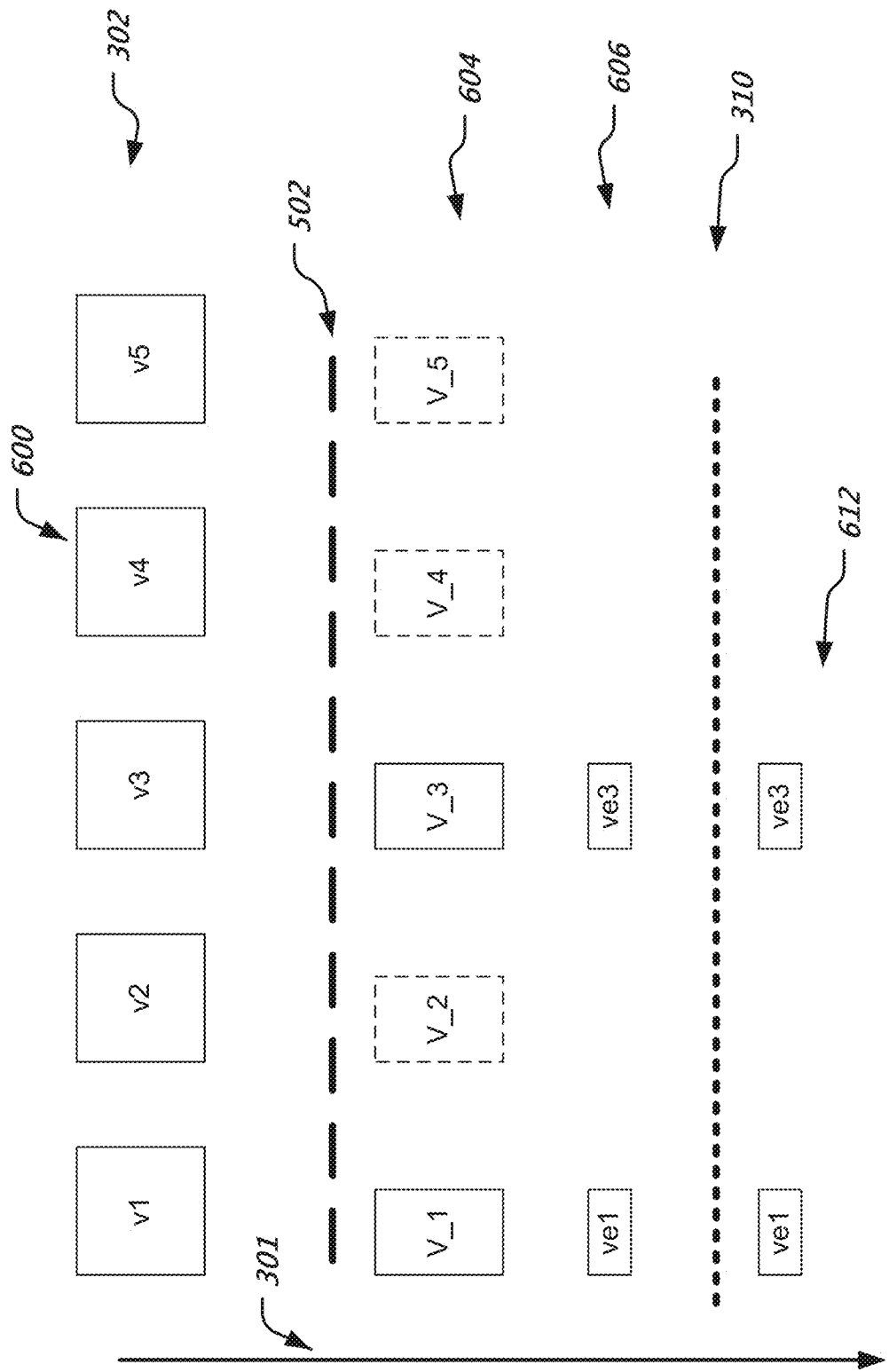
FIG. 6 illustrates another example of a video encoding timeline using resolution and rate reduction.

FIG. 6 depicts an operational scenario 600 in which both frame rate reduction and image resolution reduction are used. Such may be the case, when, for example, available network bandwidth may be very low and/or packet drop rate is high (e.g., above a threshold). In operational scenario 600, row 604 represents resolution-reduced images (ones with dashed border being dropped from subsequent compression) and row 606 represents the corresponding compressed-domain video frames. Row 612 depicts the encoded frames being transmitted over the network.

FIG. 3 to FIG. 6 illustrate various scenarios of operation of video encoder to produce video having a quality commensurate with and most suitable for available network parameters such as bandwidth, round trip delay, packet drop, and so on.

FIG. 7 depicts an example of packet syntax 700 of a network packet that may be used for transmitting compressed video. The network packet may have a strict upper limit on number of bytes (in the illustrated embodiment, the upper limit is 1200 bytes). The network packet may comprise a header field. For example, RTP defines a minimum 12 byte header field 702, a video data payload field 704, and an optional error correction code (ECC) field 706. The ECC field may be, for example, 4 bytes long.

The system 730 illustrates an example where an encoder module 732 produces compressed video bits for video frames and outputs to a buffer 734. The packetizer module 736 analyzes the produced bits in the buffer 734 for size and checks whether the size is acceptable, e.g., below a strict upper limit currently in force on the network. Based on the analysis, the packetizer module 736 provides feedback 738 to the encoder module 732. In some embodiments, the feedback may indicate the size of produced bits and thus provide information to the encoder about whether re-encoding to produce more or fewer bits should be performed. In some embodiments, the feedback may be in the form of a suggested combination of encoding parameters that the encoder should use instead of the one that was used. In this regard, offline machine learning, described in the present document, could be used to establish a relationship between target compressed video packet sizes and video encoding settings.

The system 760 depicts an alternative embodiment in which the encoder module may simultaneously produce output compressed video data at multiple encoding settings and store them in a bank of buffers 740. In this case, the packetizer module 736 may simply pick a right-sized packet from the buffer. In the case that none of the results is satisfactory, the packetizer module 736 may provide feedback 738 to the encoder module 732. Compared to the system 730, the system 760 may use more computational power due to multiple simultaneous encode operations, but may produce target packets without having to go through a feedback loop that may take from the end-to-end time delay budget in real-time communication scenarios such as video chat.

In general, the video encoding process will monitor an ongoing video chat session and produce encoded video by operating the video encoder in "normal" mode. Most commercially available or proprietary video encoders can operate in normal mode and produce satisfactory video bitstreams for a wide range of output bitrate using identical, or substantially identical parameter settings. For example, in some normal mode operations, the resulting compressed video stream may use intra-encoded and predictively encoded (or bi-predictively encoded) frames. Some video encoders may not need any external control of parameters to produce video bitstreams as low as 50 Kbps to as high as 6 Mbps.

However, the video encoder may use certain network conditions as triggers to recognize that the video encoder settings should be changed to meet the changes in network condition. For example, a change in the number of packets dropped (as reported by a receiver), a change in the round trip delay, a change in the network interface (e.g., entering from Wi-Fi to 4G network) etc. These triggers may correspond to a low mark for one or more parameter settings for the video encoding. For example, while a video encoder may satisfactorily operate within a 50 Kbps to 6 Mbps range, when forced to produce bitstream below 50 Kbps using the same video compression settings, video quality may dramatically deteriorate and the video encoder may thus require a significant, or externally controlled, alteration of parameters to produce satisfactory quality of encoded video.

In some embodiments, one of the trigger events may trigger switching of a video encoding operation between a normal mode and a starve mode. The starve mode may include various combinations of the above-described scenarios 300, 400, 500 and 600. In some embodiments, multiple trigger events may be used to select one of multiple available starve modes. For example, one starve mode may correspond to reduced frame rate operation, another starve mode may correspond to reduced image resolution operation, another starve mode may correspond to intra-frame encoding only operation, while another starve mode may include more than one of these options used in a pre-determined combination, e.g., as described in FIG. 3 to FIG. 6.

In some embodiments, machine learning may be used to train a video encoder system to make better decisions about which starve mode to use and what encoding settings to use, based on the knowledge of network conditions. In various embodiments, machine learning may be achieved using online techniques, e.g., continuous quality monitoring using automatic or human-feedback-based video quality measurements, or using offline techniques such as controlled experiments with test sequences.

Most well-known video compression schemes use a number of encoding parameters whose values can influence the number of compressed bits produced. Some of these parameters may apply to the entire frame, while others may apply to only portions of the frame (e.g., slice or macroblock basis). The availability of a large number of such parameters can be advantageously used in various embodiments of starve mode operation of a video encoder. For example, some well-known encoding algorithms, such as H.264, use a single parameter, called quantization parameter (Qp), to control the level of quantization performed while encoding a video frame. In H.264, Qp value is permitted to be between 0 to 51, and thus, using Qp, approximately 51 different sizes of resulting compressed video frame are possible. This granularity may be sufficient in many cases. However, in some embodiments, the granularity may be increased by using finer control on bit allocation and may include changing parameters such as the rate control algorithm used, whether or not intra-motion vectors are used, whether or not certain encoding features such as arithmetic encoding are used, whether or not motion vector predictor (MVP) based encoding is used, and so on. The level of bit granularity used by the encoder may be one of the video encoding parameters selected on a per-video epoch basis based on the video encoder keeping track of how many iterations have to be performed in the feedback system depicted in FIG. 7 before the encoder generates a packet that has the exact target network packet size.

Figure 8:
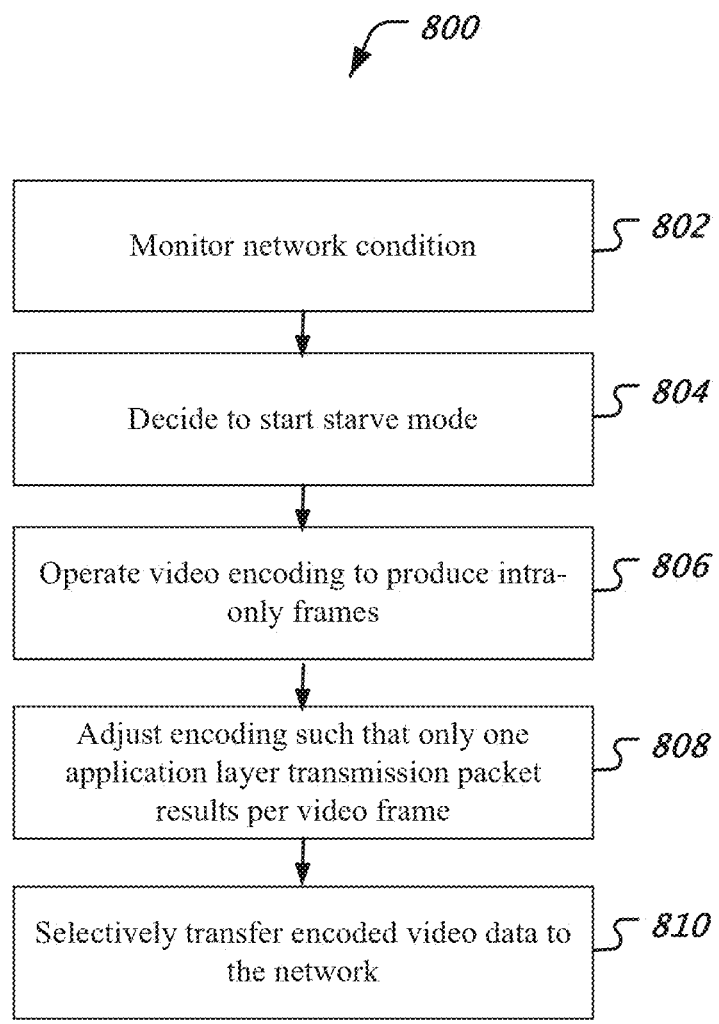
FIG. 8 is a flowchart illustrating an example method of video encoding.

FIG. 8 is a flowchart illustrating an example method 800 for operating a video encoder.

The method 800 includes, at 802, monitoring a network condition, wherein the monitoring includes tracking the status of at least some compressed video packets generated by the video encoder and transferred to the data communication network.

The method 800 includes, at 804, deciding, based on the monitoring, to change the operation of the video encoder to a starve mode in which a constrained mode of encoding is used for generating compressed video packets.

The method 800 includes, at 806, operating, in the starve mode, the video encoder to produce intra-only compressed video frames at an output of the video encoder. In some embodiments, the duration for which the intra-only encoding is performed may be proportional to a network condition such as the rate at which available network bandwidth dropped. For example, in some cases, available network bandwidth may have reduced at a rapid rate that exceeds a threshold (such may be the case when a user device enters from Wi-Fi coverage to 4G or LTE coverage). In such cases, the video encoder may decide to operate in the starve mode a bit longer than in cases where the network bandwidth has reduced slowly.

The method 800 includes, at 808, selecting an encoding parameter for the intra-only compressed video frames such that each resulting intra-encoded video frame fits within a single packet of transmission at the application layer. An application layer packet may conform to a pre-defined syntax such as RTP or similar, and may represent a unit of data transfer. In some embodiments, the user device may map each application layer packet to its own corresponding network layer packet (e.g., an internet protocol (IP) packet) to improve predictability and QoS of the video encoding and network transmission process. For example, such one-to-one mapping makes it easier to count the number of video packets being dropped or successfully delivered, simply by counting the corresponding IP packets.

In some embodiments, implementations may be kept computationally simple by using a single parameter that can uniformly impact the entirety of a video frame. Qp, for example, is used in the denominator to reduce coefficient values of each macroblock across an entire frame, and thus has a same, or uniform, effect on the entirety of frame. For example, increasing Qp value will result in fewer (or in some cases equal) bits being produced after quantization of each and every macroblock of a video frame.

In some embodiments, the method 800 may include simultaneously producing candidate video-encoded bits at least at two different encoding parameter settings to decide which ones of the at least two different encoding parameter settings results in packets that conform to the single application-layer packet restriction. For example, FIG. 7 illustrates the use of multiple buffers to simultaneously produce encoded packets of different sizes.

The method 800 includes, at 810, selectively transferring, selectively based on the network condition, the compressed video frames to the data communication network. For example, in some embodiments, the compressed video frames may be stored in an output buffer of the network interface and may be selectively transferred to the network when network bandwidth becomes available based on when the user device gains transmission opportunities to the transmission medium.

In some embodiments, e.g., as described in FIG. 3 to FIG. 6, in starve mode, the operation of a video encoder may be constrained by one or more of: changing at least one of a frame resolution or frame rate of the video, constraining each encoded video frame to be intra-frame with packet size as close to, but no greater than, network packet size. For example, a public domain implementation of the RTP protocol stack, called GoRTP, constrains RTP packets to have a 1200 byte size when sending out over the network. Some embodiments that use GoRTP may thus constrain each output intra-encoded video frame to fit within the 1200-byte packet. It will be appreciated that due to the presence of headers and optional error check-sums, actual video data may occupy less than 1200 bytes.

In some embodiments, a pre-determined schedule, e.g., a look-up table, may be used for deciding between a given trigger point and a corresponding resolution of frame rate to be used. Further, when reducing resolution, a factor of two reduction may be applied both in horizontal and vertical dimensions due to simplicity of implementation. In some embodiments, frame rate reduction may be achieved by dropping a pre-determined sequence of frames.

It will be appreciated that various techniques have been described above with respect to the method 800 for operating a video encoder in a starve mode.

Computer System

Figure 9:
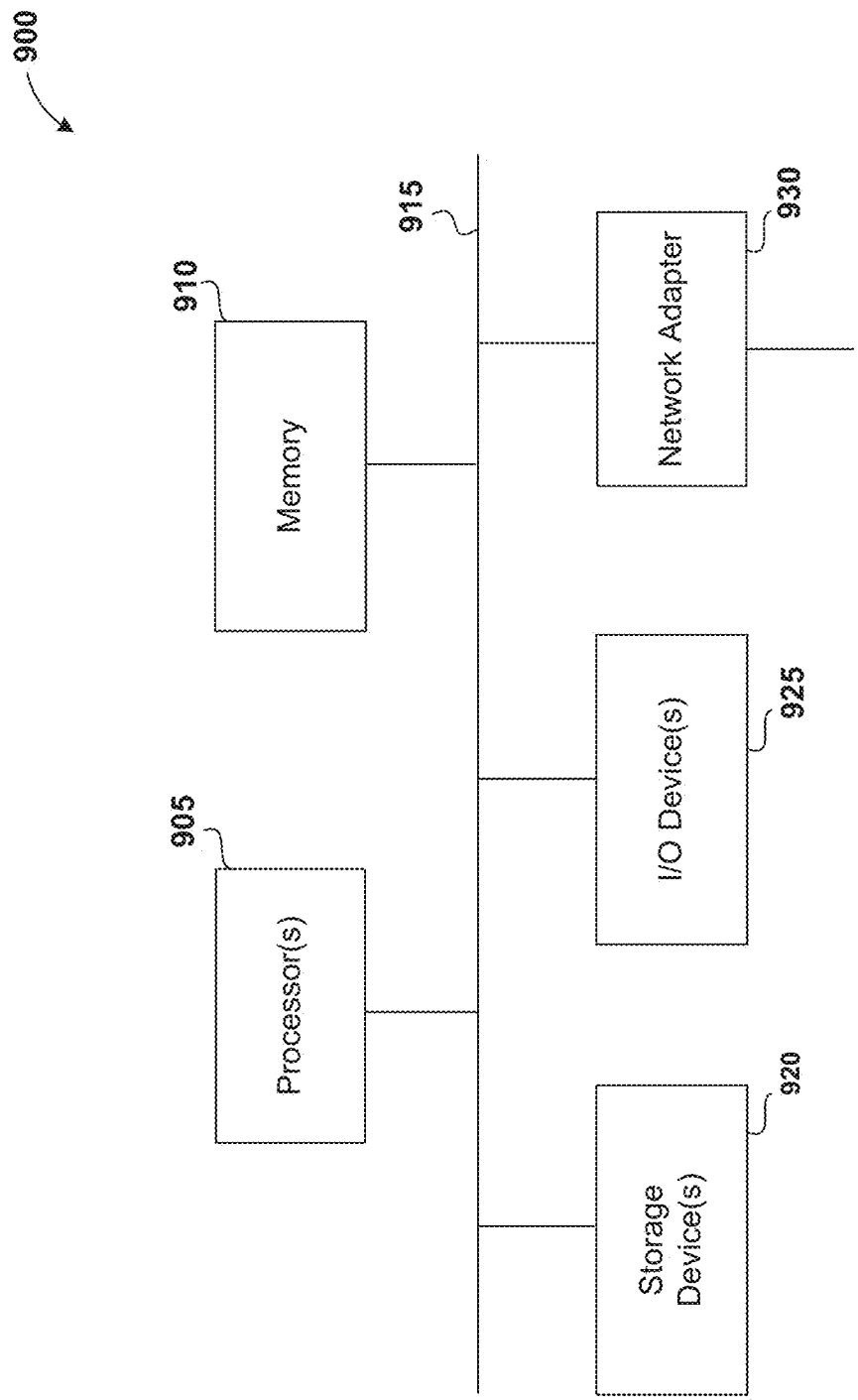
FIG. 9 is a block diagram illustrating an example computing device, consistent with various embodiments.

FIG. 9 is a block diagram of a computer system as may be used to implement features of some of the embodiments, for example, master nodes or worker nodes, as described herein. The computing system 900 may include one or more central processing units ("processors") 905, memory 910, input/output devices 925 (e.g., keyboard and pointing devices, and display devices), storage devices 920 (e.g., disk drives), and network adapters 930 (e.g., network interfaces) that are connected to an interconnect 915. The interconnect 915 is illustrated as an abstraction that represents any one or more separate physical buses, point to point connections or both, connected by appropriate bridges, adapters, or controllers. The interconnect 915, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 910 and storage devices 920 are computer-readable storage media that may store instructions that implement at least portions of the various embodiments. In addition, the data structures and message structures may be stored or transmitted via a data transmission medium, for example, a signal on a communications link. Various communications links may be used, including the Internet, a local area network, a wide area network, or a point-to-point dial-up connection. Thus, computer-readable media can include computer-readable storage media (e.g., "non-transitory" media) and computer-readable transmission media.

The instructions stored in memory 910 can be implemented as software and/or firmware to program the processor(s) 905 to carry out actions described above. In some embodiments, such software or firmware may be initially provided to the computing system 900 via download from a remote system to the computing system 900 (e.g., via network adapter 930).

In some embodiments, a user device may include at least a memory, a processor, and a network interface. The memory may store instructions that, when executed by the processor, cause the processor to transmit encoded video over the network interface. The instructions may include instructions for performing a video compression operation and producing encoded video frames, instructions for transferring the encoded video frames over the network interface at a present output frame rate, instructions for monitoring the present output frame rate for deviation from a target output frame rate, and instructions for selectively adjusting the quality of future encoded video frames when the present output frame rate deviates from the target output frame rate.

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Figure 10:
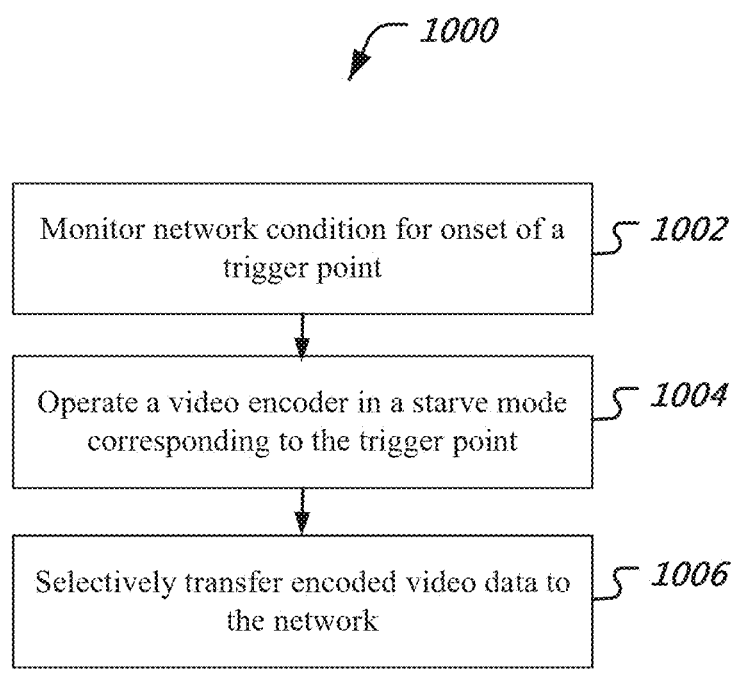
FIG. 10 is a flowchart illustrating an example method of controlling the operation of a video encoder.

FIG. 10 is a flowchart illustrating a method 1000 of controlling the operation of a video encoder. The method 1000 includes, at 1002, monitoring the condition of a network for a trigger point for switching a mode of video encoding operation to sustain an ongoing video communication due to changes in the network condition.

The method 1000 includes, at 1004, deciding, upon detecting that a trigger point has been reached and based on an identity of the trigger point, to operate a video encoder in a corresponding starve mode by modifying at least one parameter of video encoding. In a starve mode, the video encoder is controlled to produce, for each compressed video frame, a number of bits that fit within exactly one network packet of a pre-determined size. Furthermore, in the starve mode, the video encoder is controlled to produce intra-only encoded video frames.

The method 1000 includes, at 1006, transferring, selectively based on the condition of the network, compressed video frames over the network. For example, in some operational scenarios, due to the delay in the generation of encoded video frames, by the time a packet is ready to be sent out on the network, a short-term unavailability of network bandwidth may require either delaying or entirely skipping transmission of a network packet. As previously described, each network packet may be produced to occupy a number of bits as close to, but less than, a target network packet size such that a single network packet, e.g., an IP packet, carries all information that a receiver needs to uncompress and display a single video frame. Furthermore, as previously described herein, the encoder in starve mode may also perform image resolution reduction and/or frame rate reduction to provide high quality of user experience even when network bandwidth availability is reduced. FIG. 7 shows an example of the network packet, which may include a header field, a payload field carrying video data, and an error correction code field. In some embodiments, the network conditions may be reported to the video encoder via feedback from the network, e.g., RTCP packets as specified in the RTP protocol, which is a well-known industry standard.

In some embodiments, e.g., as depicted in FIG. 7, an apparatus for performing real-time video communication includes an encoder module that produces one or more compressed video representations of a video frame, one or more buffers that store the one or more compressed video representations, and a packetizer module that checks the sizes of the one or more compressed video representations and provides feedback to the encoder module about altering a parameter for producing the one or more compressed video representations. The encoder module is operable in at least two modes of operation including a normal mode in which the encoder module produces the one or more compressed video representations by refraining from altering the parameter based on the feedback, and a starve mode in which the encoder module produces the one or more compressed video representations by performing intra-only encoding of the video frame and further based on the feedback received from the packetizer module. In some embodiments, the encoder module includes an image resolution filter module that operates to downsample the video frame prior to compression, based on the feedback. In some embodiments, the encoder module includes a look-up table that controls the frame rate used for encoding the output compressed video based on the feedback.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example, by italics and/or quotation marks. The use of highlighting has no influence on the scope and meaning of a term—the scope and meaning of a term is the same, in the same context, whether or not it is highlighted. It will be appreciated that the same thing can be said in more than one way. One will recognize that "memory" is one form of "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader and should in no way limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The invention claimed is:

1. A computer-implemented method of operating a video encoder in a data communication network, comprising:
   monitoring a network condition, wherein the monitoring includes tracking status of at least some compressed video packets generated by the video encoder and transferred to the data communication network;
   deciding, based on the monitoring, to change operation of the video encoder to a starve mode in which a constrained mode of encoding is used for generating compressed video packets;
   operating, in the starve mode, the video encoder to produce intra-only compressed video frames from uncompressed video frames, wherein the operating comprises:
      selectively dropping at least one of the uncompressed video frames based on a detected scene change and the network condition, and
      selecting an encoding parameter for the intra-only compressed video frames based on a size of a packet of transmission, wherein the encoding parameter includes a frame resolution; and
   transferring, selectively based on the network condition, the compressed video frames to the data communication network.

2. The method of claim 1, wherein the encoding parameter comprises a quantization parameter that uniformly affects encoding of an entirety of each video frame.

3. The method of claim 1, further comprising:
   simultaneously producing candidate video encoded bits at least at two different encoding parameter settings to decide which ones of the at least two different encoding parameter settings result in packets that fit within the single packet of transmission.

4. The method of claim 1, further comprising:
   operating the video encoder in the starve mode for a duration of time that is proportional to the monitored network condition.

5. The method of claim 1, further comprising:
   changing at least one of the frame resolution or frame rate of the video.

6. The method of claim 5, wherein the frame resolution and frame rate options are stored in a look-up table.

7. The method of claim 1, wherein the single packet of transmission comprises a packet having a length of 1200 bytes or less.

8. The method of claim 1, further including, receiving a control packet from at least one other device indicative of the network condition.

9. The method of claim 8, wherein, the control packet includes information about a number of lost packets.

10. The method of claim 1, wherein the transferring is performed by refraining from re-transmission of a previously transferred packets.

11. A computer program product comprising a non-transitory computer-readable medium that stores processor-executable code for implementing a method of performing video encoding comprising:
    monitoring a network condition, wherein the monitoring includes tracking status of at least some compressed video packets generated by a video encoder and transferred to a data communication network;
    deciding, based on the monitoring, to change operation of the video encoder to a starve mode in which a constrained mode of encoding is used for generating compressed video packets;
    operating, in the starve mode, the video encoder to produce intra-only compressed video frames from uncompressed video frames, wherein the operating comprises:
       selectively dropping at least one of the uncompressed video frames based on a detected scene change and the network condition, and
       selecting an encoding parameter for the intra-only compressed video frames based on a size of a packet of transmission, wherein the encoding parameter includes a frame resolution; and
    transferring, selectively based on the condition of the network, the compressed video frames to the data communication network.

12. The computer program product of claim 11, wherein the operating further comprises:
    constraining a quantization parameter to produce a number of bits that fits within exactly one network packet.

13. The computer program product of claim 11, wherein the operating further comprises:
    reducing resolution of a video prior to compressing the uncompressed video frames.

14. The computer program product of claim 13, wherein the transferring the compressed video frames comprises:
    refraining from transferring at least some of the compressed video frames to the data communication network.

15. The computer program product of claim 11, wherein the packet comprises a header field, a video data field, and an error correction coding field.

16. The computer program product of claim 11, wherein the monitoring the network condition comprises: receiving control packets from the data communication network indicative of the condition of the data communication network.

17. The computer program product of claim 16, wherein the control packets include information about a number of lost packets or a round-trip network delay of a previously transmitted compressed video packet.

* * * * *